United States Patent
Watanabe

(10) Patent No.: US 8,348,598 B2
(45) Date of Patent: Jan. 8, 2013

(54) WIND TURBINE GENERATOR AND ROLLING BEARING FOR WIND TURBINE GENERATOR

(75) Inventor: Naota Watanabe, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 64 days.

(21) Appl. No.: 12/845,152

(22) Filed: Jul. 28, 2010

(65) Prior Publication Data

US 2011/0291422 A1    Dec. 1, 2011

(51) Int. Cl.
*F01D 7/00* (2006.01)
*F16C 19/00* (2006.01)
*F16C 19/10* (2006.01)

(52) U.S. Cl. ........... 415/131; 384/461; 384/609; 290/44

(58) Field of Classification Search .................. 290/44, 290/55; 384/461, 609, 613; 415/174, 131, 415/204 R, 61

See application file for complete search history.

(56) References Cited

U.S. PATENT DOCUMENTS

| 6,302,588 | B1 | 10/2001 | Brown | |
|---|---|---|---|---|
| 2008/0199315 | A1* | 8/2008 | Bech | 416/61 |
| 2009/0232652 | A1* | 9/2009 | Keller et al. | 416/1 |
| 2010/0068055 | A1 | 3/2010 | Erill | |
| 2011/0031755 | A1* | 2/2011 | Numajiri | 290/55 |
| 2011/0057451 | A1* | 3/2011 | Volmer et al. | 290/55 |

FOREIGN PATENT DOCUMENTS

| JP | 5231424 | A | | 9/1993 |
|---|---|---|---|---|
| JP | 05231424 | A | * | 9/1993 |
| JP | 2002142406 | A | | 5/2002 |
| JP | 2002540354 | A | | 11/2002 |
| JP | 2004028003 | A | * | 1/2004 |
| JP | 2009500557 | T | | 1/2009 |
| JP | 2009287628 | A | * | 12/2009 |
| JP | 2010511122 | T | | 4/2010 |

OTHER PUBLICATIONS

International Search Report for PCT/JP2010/059206 mailed Aug. 3, 2010.

* cited by examiner

*Primary Examiner* — Julio Gonzalez
(74) *Attorney, Agent, or Firm* — Kanesaka Berner & Partners

(57) ABSTRACT

In order to provide a rolling bearing for a wind turbine and a wind turbine which can prevent the deterioration of the lubrication condition even when the rolling bearing receives high load while the inner ring and the outer ring are kept still relative to each other, the wind turbine generator of the present invention for supporting a first member and a second member which rotates relative to the first member, comprises an inner ring to which the first member is fixed; an outer ring to which the second member is fixed; a center ring which is arranged between the inner ring and the outer ring and can rotate independently of the inner ring and the outer ring; rolling elements which are provided between the bearing rings in such a manner that the rolling elements can freely roll; and a center ring drive unit for rotating the center ring.

8 Claims, 4 Drawing Sheets

WIND TURBINE GENERATOR AND ROLLING BEARING FOR WIND TURBINE GENERATOR

RELATED APPLICATIONS

The present application is based on, and claims priority from, International Application Number PCT/JP2010/059206, filed May 31, 2010, the disclosure of which is hereby incorporated by reference herein in its entirety.

BACKGROUND OF THE INVENTION

1. Field of the Invention

The present invention relates to rolling bearings that receive high static load of a wind turbine generator and a wind turbine generator using the rolling bearings.

2. Description of the Related Art

A wind turbine generator generally consists of a rotor hub to which blades for receiving the wind are connected, a rotation shaft for transmitting the rotation of the rotor hub to a generator side, a tower, and a nacelle for housing the rotation shaft, the generator and the like.

In the wind turbine generator, a variety of rolling bearings are used such as bearings for supporting a nacelle base such that the nacelle base can swivel, and bearings for supporting the blades such that the pitch of the blade can be adjusted.

This wind turbine generator is exposed to weather such as a strong wind, and thus the rolling bearings are subjected to high load. Further, from a perspective of efficient power generation, it is encouraged to make larger wind turbine generators and the load on the roller bearings of the wind turbine generator gets higher.

To take measure against such high load, Patent Document 1 proposes a roller bearing having an inner ring, a center ring, and an outer ring for supporting the blades such that the pitch of the blades can be adjusted. In the rolling bearing, the center ring to which the blade is fixed is supported from both surfaces thereof by the inner ring and the outer ring so that the high load on the rolling bearing is diversified.

PATENT REFERENCE

[PATENT DOCUMENT 1] US 2008/0199315

SUMMARY OF THE INVENTION

Meanwhile, the rolling bearing is usually subjected to the load while rotating and thus it is maintained in the lubrication state between the bearing ring and the rolling elements. However, as for the rolling bearing for the wind turbine generator, the lubrication condition between the bearing ring and the rolling elements may deteriorate for the following reason.

In the wind turbine generator, the pitch control may not be performed for a long period of time depending on the wind conditions and an inner ring and an outer ring of the bearings remains still relative to each other over a long period of time. When the bearing receives high load while the inner ring and outer ring are kept still relative to each other, the high load causes grease to come out from the space between the bearing rings (inner ring outer ring) and the rolling elements and the lubrication condition of the bearing deteriorates.

In this regard, the rolling bearing disclosed in Patent Document 1, improves the durability thereof by supporting the center ring to which the blades are fixed from both sides of the center ring by the inner ring and the outer ring as the load on the bearing is dispersed. However, there is no measure taken against the deterioration of the lubrication condition due to the high load on the bearing while the pitch of the blade is constant (the pitch angle of the blade is still relative to the rotor hub).

Moreover, in order to keep the bearing in the lubrication state, it is possible to turn the nacelle or change the pitch of the blades regularly but unnecessary swiveling of the nacelle or unnecessary pitch control can lower the power generation efficiency.

In view of the problems above, an object of the present invention is to provide a rolling bearing for a wind turbine and a wind turbine which can prevent the deterioration of the lubrication condition even when the rolling bearing receives high load while the inner ring and the outer ring are kept still relative to each other.

To solve the problems above, the present invention provides a rolling bearing for a wind turbine generator for supporting a first member and a second member which rotates relative to the first member, the rolling bearing comprising: an inner ring to which the first member is fixed; an outer ring to which the second member is fixed; a center ring which is arranged between the inner ring and the outer ring and can rotate independently of the inner ring and the outer ring; rolling elements which are provided between the inner ring and the center ring and between the center ring and the outer ring in such a manner that the rolling elements can freely roll; and a center ring drive unit for rotating the center ring.

In the rolling bearing, the center ring which can rotate independently of the inner ring and the outer ring, is arranged between the inner ring and the outer ring and is rotated by the center ring drive unit so that the rolling elements which are provided between the inner ring and the center ring and between the center ring, roll when the center ring is rotated. Therefore, even when the inner ring and the outer ring of the bearing are kept still relative to each other and the bearing is subjected to the high load, the lubrication state between the bearing rings and the rolling elements is kept from getting worse by rotating the center ring.

Moreover, the center ring provided between the inner ring and the outer ring can rotate independently of the inner ring having the first member fixed thereto and the outer ring having the second member fixed thereto and thus the rotation of the center ring by the center ring drive unit does not affect the inner ring and the outer ring as well as the first member and the second member being fixed to the inner and the outer rings. Therefore, there is no need for performing unnecessary nacelle turn or the pitch control of the blade, which results in lowering the power generation efficiency.

In the rolling bearing for the wind turbine generator preferably further comprises a control unit for controlling the center ring drive unit to rotate the center ring when the first member is kept still relative to the second member for a predetermined period of time. Herein, instead of constantly rotating the centering, the control unit controls such that the center ring rotates at timing as needed.

In this manner, when the first member is kept still relative to the second member for a predetermined period of time, the center ring drive unit rotates the center ring so as to reduce the energy required to drive the center ring.

In the above-described rolling bearing for the wind turbine generator, the center drive unit may include a power source which supplies power to a drive shaft and a gearing mechanism which transmits the power having been outputted from the drive shaft to the center ring.

The power source is a composition element to supply power to the drive shaft and may not limited by its physical, mechanical or electrical configuration such as its type of energy, supply method and the structure of the drive shaft. The power source, for example, may be an electric motor runs on electric power obtained from outside source or the generator.

The gearing mechanism herein may be a group of gears which can transmit the power and not limited by its physical or mechanical configuration. The gears used as the gearing mechanism, for example, may be helical gears, double helical gears, rack gears, bevel gears, crown gears, worm gears or hypoid gears.

For instance, the center ring may have a projecting portion which projects in an axial direction relative to the inner ring and the outer ring, and the gearing mechanism includes a first gear which is fixed to the drive shaft of the center ring drive unit and a second gear which is formed on an inner or outer circumference of the projecting portion of the center ring and meshes with the first gear.

Alternatively, the gearing mechanism may include a worm gear fixed to the drive shaft and another gear formed on an end surface of the center gear in an axial direction thereof and meshes with the worm gear.

In such case that the rolling bearing of the wind turbine generator is used for supporting the pitch control, one of the first member and the second member is a blade and the other is a rotor hub.

In such case that the rolling bearing of the wind turbine generator is used as a nacelle turning part, one of the first member and the second member is a tower installed upright on a base and the other is a nacelle.

In wind turbine generator, as described above, the rolling bearing is constructed such that the center ring which can rotate independently of the inner ring and the outer ring, is arranged between the inner ring and the outer ring and is rotated by the center ring drive unit. Thus, the rolling elements which are provided between the inner ring and the center ring and between the center ring, roll when the center ring is rotated. Therefore, even when the inner ring and the outer ring of the bearing are kept still relative to each other and the bearing is subjected to the high load, the lubrication state between the bearing rings and the rolling elements is prevented from getting worse.

Moreover, the center ring provided between the inner ring and the outer ring can rotate independently of the inner ring having the first member fixed thereto and the outer ring having the second member fixed thereto and thus the rotation of the center ring by the center ring drive unit does not affect the inner ring and the outer ring as well as the first member and the second member being fixed to the inner and the outer rings. Therefore, there is no need for performing unnecessary nacelle turn or the pitch control of the blade, which results in lowering the power generation efficiency.

EFFECT OF THE INVENTION

According to the present invention, the center ring which can rotate independently of the inner ring and the outer ring, is arranged between the inner ring and the outer ring and is rotated by the center ring drive unit so that the rolling elements which are provided between the inner ring and the center ring and between the center ring, roll when the center ring is rotated. Therefore, even when the inner ring and the outer ring of the bearing are kept still relative to each other and the bearing is subjected to the high load, the lubrication state between the bearing rings and the rolling elements is prevented from getting worse.

Moreover, the center ring provided between the inner ring and the outer ring can rotate independently of the inner ring having the first member fixed thereto and the outer ring having the second member fixed thereto and thus the rotation of the center ring by the center ring drive unit does not affect the inner ring and the outer ring as well as the first member and the second member being fixed to the inner and the outer rings. Therefore, there is no need for performing unnecessary nacelle turn or the pitch control of the blade, which results in lowering the power generation efficiency.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
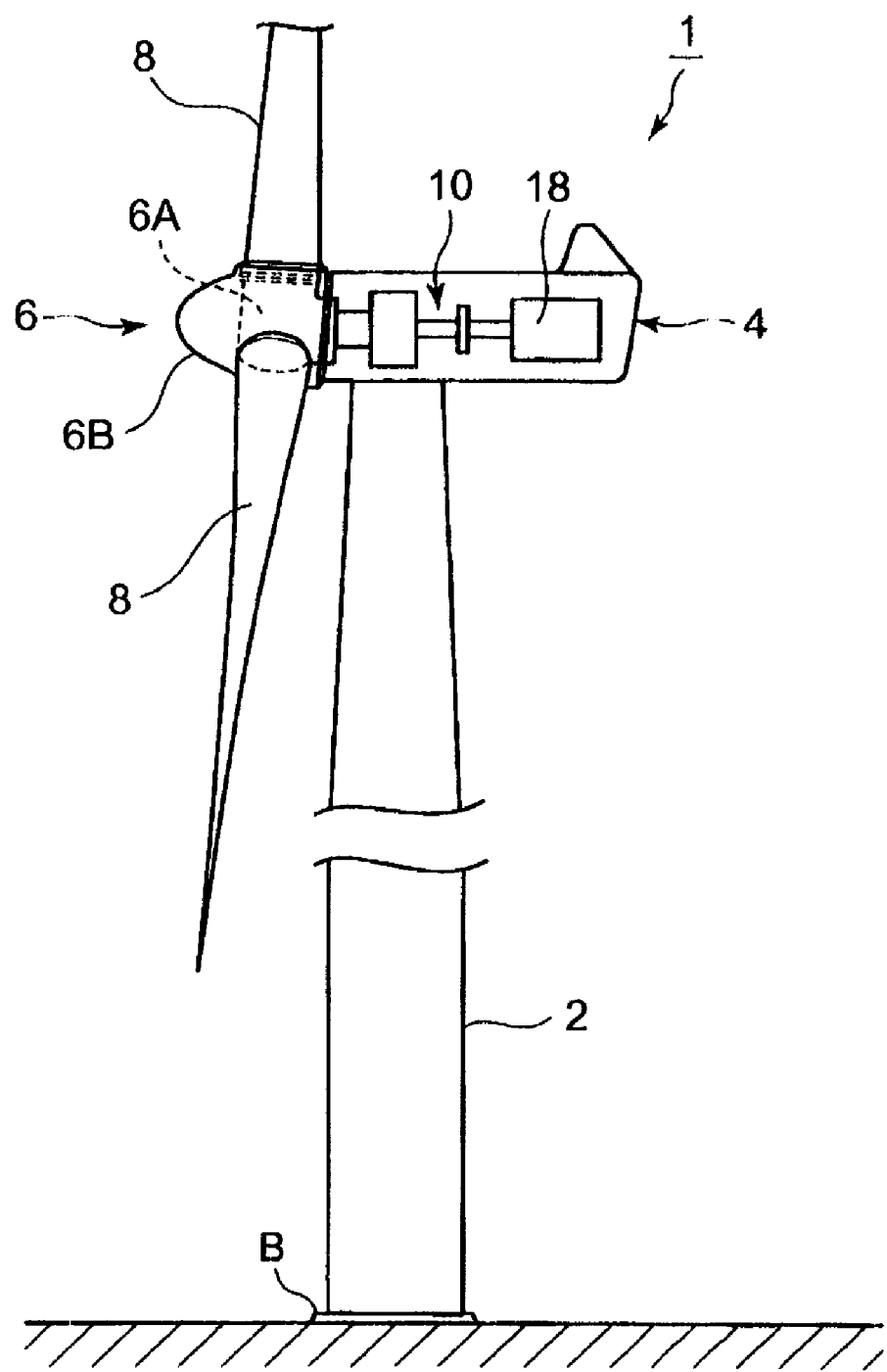
FIG. 1 A general structure of a wind turbine generator.

FIG. 1 is a general structure of a wind turbine generator in relation to one embodiment of the present invention. A wind turbine generator 1 mainly includes, as shown in FIG. 1, a tower 2 provided to stand on a foundation B, a nacelle 4 provided on the upper end of the tower 2, a rotor head 6 provided on the nacelle 4, and a plurality of blades 8 attached to the rotor head 6.

As shown in FIG. 1, the tower 2 has a column-like shape extending upwardly (to the upper end of FIG. 1) from the foundation B. The tower 2, for example, can be made from a single column-like member or made from a plurality of units aligned in upright direction and coupled to each other. If the tower 2 is made from the plurality of units, the nacelle 4 is provided on the unit located on the top of the tower 2.

The nacelle 4 supports the rotor head 6 and accommodates a drive train 10 and a generator 18, etc.

Figure 2:
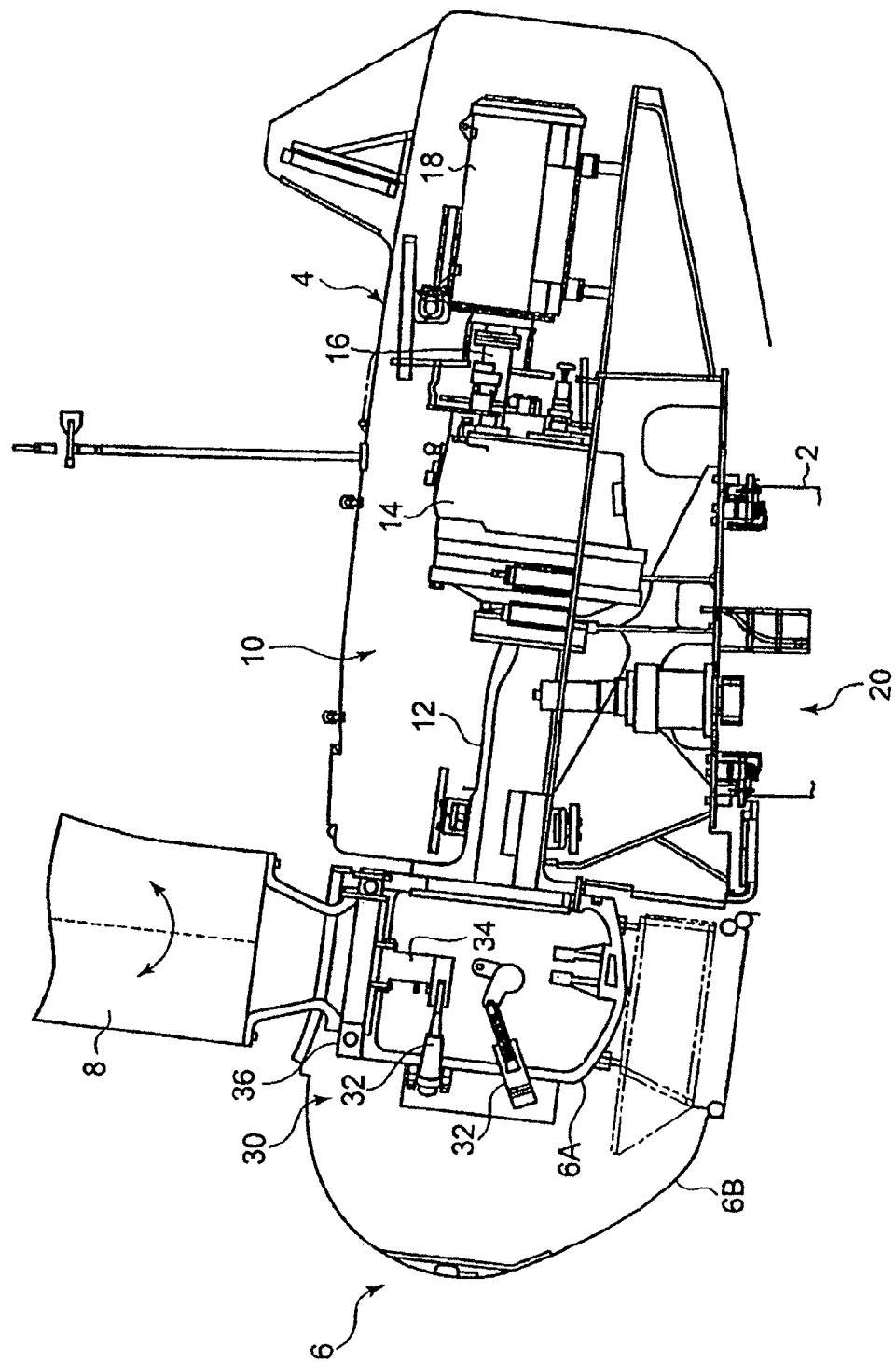
FIG. 2 A side view showing a rotation shaft and a generator.

FIG. 2 shows a detailed view of the drive train 10 and the generator 18 inside the nacelle 4. The drive train 10 includes a main shaft 12 that is connected to a rotor hub 6A of the rotor head 6, a gearbox 14 connected to the main shaft 12 and a coupling 16 that couples the gear box 14 to the generator 18. In the wind turbine generator 1, when the blades 8 receive the wind, the main shaft 12 rotates with the rotor hub 6A and the rotation of the main shaft 12 is speeded up by the gearbox 14, and then inputted to the generator 18 via the coupling 16. Moreover, under the nacelle 4, a nacelle turning mechanism 20 is provided so as to turn the nacelle 4 relative to the tower 2.

Figure 3:
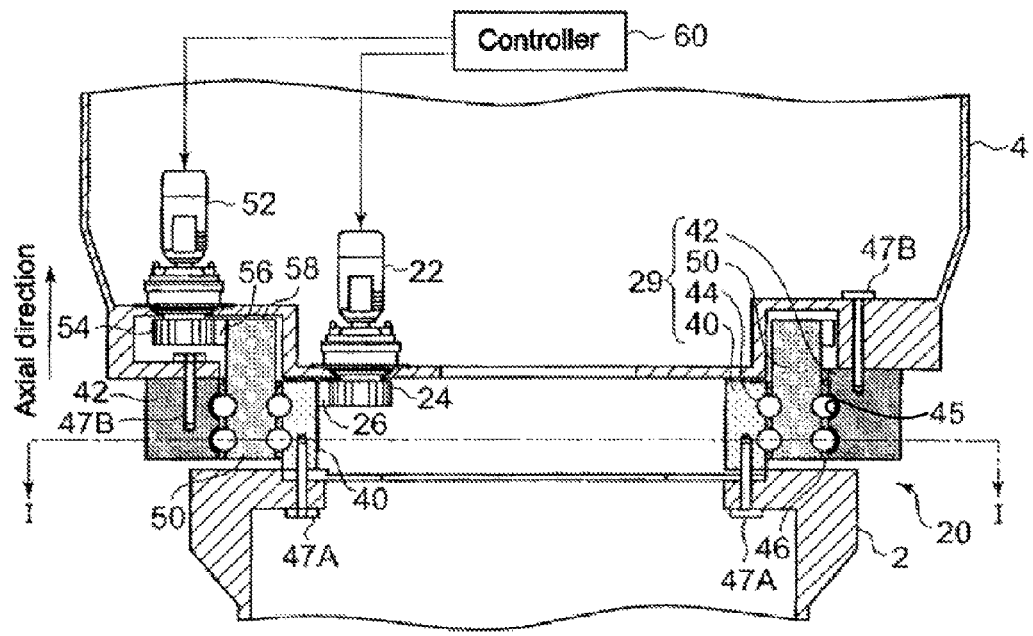
FIG. 3 A sectional view of the nacelle turning part as an example structure of the rotation shaft and the center ring drive unit.

FIG. 3 illustrates an example structure when the present invention is applied to the nacelle turning mechanism 20.

The nacelle turning mechanism 20 comprises a yaw motor 22, a pinion gear 24 being rotated by the drive of the yaw motor 22, and a gear 26 meshing with the pinion gear 24 as shown in FIG. 3. Further, in the nacelle turning mechanism 20, the nacelle 4 is fixed to the tower 2 via a rolling bearing 29 in such a manner that the nacelle can turn freely relative to the tower 2.

The rolling bearing 29 comprises an inner ring 40 and an outer ring 42 which are bearing rings having the same rotating shaft. On the inner circumference of the inner ring 40, the gear 26 is formed to mesh with the pinion gear 24 and the inner ring 40 is fixed to the tower 2 via a bolt 47A while the outer ring 42 is fixed to the nacelle 4 via another bolt 47B.

The nacelle 4 is attached firmly to the tower 2 via the rolling bearing 29 with the above structure so that when the yaw motor is actuated, the power is transmitted from the pinion gear 24 to the gear 26 and the nacelle being fixed to the outer ring 42 of the rolling bearing 29 turns relative to the tower being fixed to the inner ring 40 of the rolling bearing 29. Further, the yaw motor 22 is controlled by a controller 60 for controlling the swiveling of the nacelle. By this, the yaw motor 22 is actuated so as to turn the nacelle 4.

In the present embodiment, even in a state that the inner ring 40 and the outer ring 42 are still relative to each other and subjected to high load, from the view point of keeping the rolling bearing 29 lubricated, a center ring 50 is provided between the inner ring 40 and the outer ring 42. The center ring 50 can rotate independently of the inner ring 40 and the outer ring 42 and is rotated by a center ring drive unit.

The center ring 50 is a bearing ring which has a same rotating shaft as the inner ring 40 and the outer ring 42, and is not fixed to the inner ring 40 or the outer ring 42 so as to rotate independently of the inner ring 40 and the outer ring 42.

Between the inner ring 40 and the center ring 50 and also between the center ring 50 and the outer ring 42, grooves 45 are arranged so as to house balls 44 in such manner that the balls 44 can freely roll therein. The ball 44 is an example of a rolling element which rolls in response to the rotation of each of the bearing rings, and may be substituted with a roller.

In the space between each of the bearing rings, i.e. in the space surrounding the ball 44, a lubricant agent 46 is filled. Any agent can be used as the lubricating agent as long as it can form a lubricating coating on a surface of the ball 44 and can reduce the friction between each of the bearing rings and grease is one of them. For instance, lubricant oil can be used as the lubricating agent.

The structure of the center ring drive unit of the rolling bearing 29 is not limited as long as it is capable of rotating the center ring 50 of the rolling bearing 29. For example, it can be a motor 52 for driving the center ring which supplies drive power to the center ring 50 via a "gearing mechanism" mainly comprising a first gear 54 and a second gear 56.

Herein, the first gear 54 is fixed to a drive shaft of the motor 52 for driving the center ring while the second gear 56 is provided on the outer circumference of the center ring 50.

The second gear 56 is formed on the outer circumference of a projection 58 of the center ring 50 which projects in an axial direction (projection that projects relative to the inner ring and the outer ring). FIG. 3 illustrates such an example that the second gear 56 is the external gear being formed on the outer circumference of the projection 58 of the center ring 50 but the second gear 56 may be formed as an internal gear formed on the inner circumference of the projection 58. By providing the second gear 56 on the projection 58, the gearing mechanism can be arranged efficiently without hindering the rotation of other bearing rings, e.g. the inner ring 40 and the outer ring 42.

In this manner, the motor 52 for driving the center ring rotates the center ring 50 so that the balls 44 roll in response to the rotation of the center ring 50, and the lubricant agent 46 can recover the lubrication state. As described above, the center ring 50 can be driven independently of the inner ring 40 and the outer ring 42 and thus, the rolling bearing 29 can still be maintained in the lubrication state by driving the center ring 50 alone, even when the inner ring 40 and the outer ring 42 are not rotated e.g. when the condition of the wind received by the wind turbine generator 1 does not change and the nacelle 4 does not need to be turned.

The motor 52 for driving the center ring may always stay on, but from a view point of maintaining the lubrication state to the minimum necessary, it is preferable to turn on and off the motor 52. For instance, it is preferable to activate the motor 52 regularly by a calendar timer such as a timer switch, or to activate the motor 52 by the controller (control unit) 60 only when the lubrication state of the rolling bearing 29 is predicted to worsen.

Especially, it is preferable to use the controller 60 so as to control the motor 52 to rotate the center ring 50 when the nacelle is kept still for a predetermined period of time. By this, the motor 52 for driving the center ring 50 is not activated except for the time when the nacelle is kept still for a long period of time and the lubrication state is predicted to worsen, resulting in not wasting the energy.

Meanwhile, the second gear 56 may be provided on a part of the outer circumference of the center ring 50. That is, the second gear 56 does not have to be provided on the entire circumference of the center ring 50. In such case, by reciprocating the first gear 54 by the motor 52, the center ring 50 rotates clockwise and counterclockwise.

Moreover, FIG. 3 shows the example of the second gear 56 being provided on the projection 58 of the center ring 50, which projects in an axial direction but the second gear 56 may be provided on the end surface of the center ring 50 in the axial direction thereof.

Figure 4:
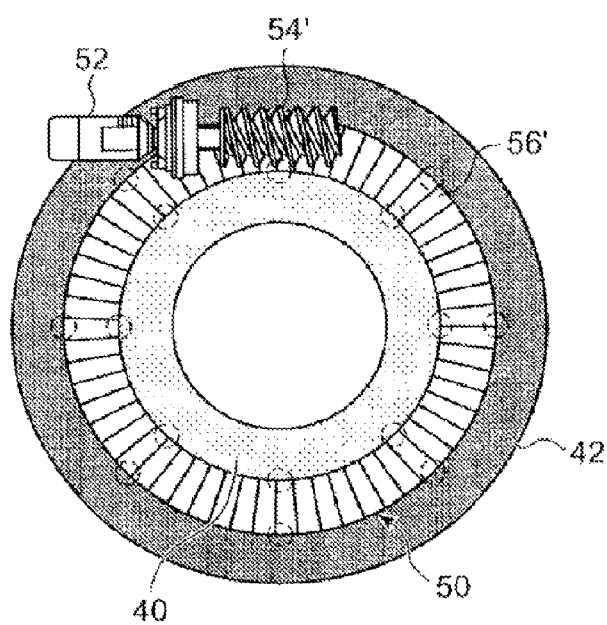
FIG. 4 A top view in the case of using a worm gear mechanism as the center ring drive unit.

FIG. 4 is a top view showing an example structure of the gearing mechanism in which the second gear 56 is arranged on the end surface of the center gear 50 in the axial direction thereof. In the gearing mechanism of FIG. 4, the second gear 56 is arranged on the end surface of the center ring 50 in the axial direction thereof and a worm gear 54' is fixed to the drive shaft of the motor 52 for driving the center ring so as to mesh with the second gear 56.

In the preferred embodiment, the inner ring 40 is fixed to the tower 2 by the bolt 47A and the outer ring 42 is fixed to the nacelle 4 by the bolt 47B, but it is obvious to a skilled person to reverse this structure by fixing the outer ring 42 to the tower 2 by a bolt and fixing the inner ring 40 to the nacelle 4 by a bolt.

In this manner, in the wind turbine generator 1 in relation to the present embodiment, even in a state that the inner ring 40 and the outer ring 42 are still relative to each other and subjected to high load, the rolling bearing 29 can be kept in the lubrication state by rotating only the center ring 50.

Further, in the wind turbine generator 1 shown in FIG. 1 and FIG. 2, the rotor head 6 is fixed to the nacelle 4 in such a manner that the rotor head can rotate around near horizontal axis, and includes the rotor hub 6A to which the blades 8 are fixed and a head capsule 6B which cover the rotor hub 6A.

Furthermore, as shown in FIG. 2, the rotor hub 6A has a pitch control mechanism 30 for adjusting the pitch angle of the blades 8 by turning the blades 8 around the axis thereof (the direction indicated with an arrow in FIG. 2).

The pitch control mechanism 30 as illustrated in FIG. 2, comprises a cylinder 32 and a shaft 34 being connected to the blade 8. In the pitch control mechanism 30, in order to adjust the pitch of the blade 8, the blade 8 is fixed to the rotor hub 6A rotatably via a rolling bearing 36.

Figure 5:
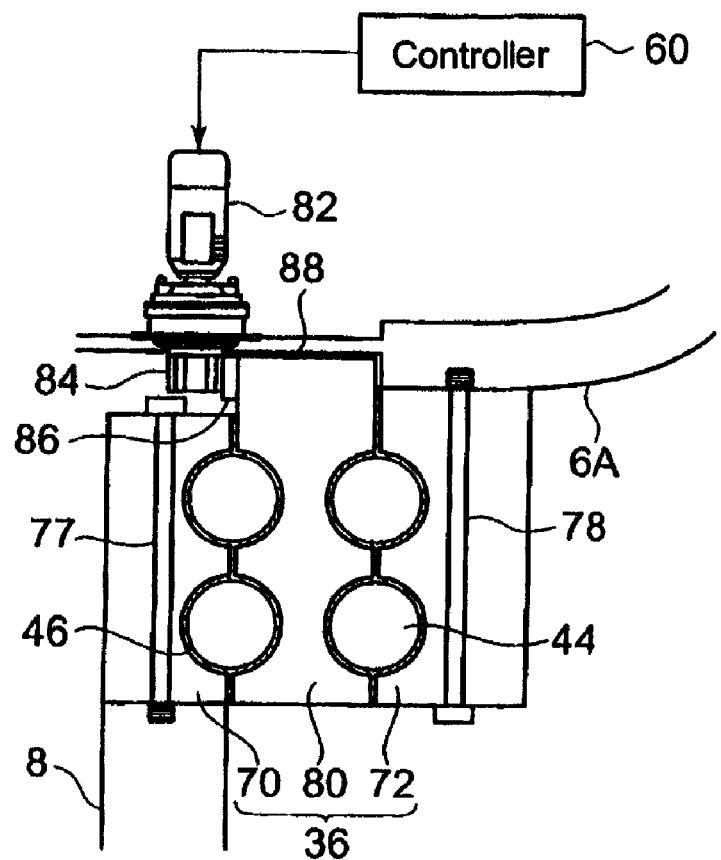
FIG. 5 A sectional view showing an example structure of a rolling bearing of a pitch control mechanism.

FIG. 5 is a sectional view showing an example structure of the rolling bearing 36 for supporting the blade 8 to the rotor hub 6A. Herein, the same reference numbers are used to describe the components same as the first rolling bearing 29 (specifically, the balls 44 and the lubricant agent 46) and will not be explained further.

As shown in FIG. 5, the rolling bearing 36 includes a inner ring 70 and an outer ring 72 which are bearing rings having a same rotating shaft and the inner ring 70 is fixed to the blade by a bolt 77 and the outer ring 72 is fixed to the rotor hub 6A by a bolt 78.

The blade 8 is fixed to the rotor hub 6A via the rolling bearing 36 so that when the shaft 34 shown in FIG. 2 is rotated by the cylinder 32 shown in FIG. 2, the inner ring 70 to which the blade 8 is fixed rotates relative to the outer ring 72 to which the rotor hub 6A is fixed so as to change the pitch of the blade 8.

In the present embodiment, even in a state that the inner ring 70 and the outer ring 72 are still relative to each other and subjected to high load, from the view point of keeping the rolling bearing 36 lubricated, provided are a center ring 80 between the inner ring 70 and the outer ring 72 and a center ring drive unit for rotating the center ring 80 independently of the inner ring 70 and the outer ring 72.

The center ring 80 is a bearing ring which has the same rotating shaft as the inner ring 70 and the outer ring 72, and is not fixed to the inner ring 70 or the outer ring 72 so as to rotate independently of the inner ring 70 and the outer ring 72.

The structure of the center ring drive unit of the rolling bearing 36 is not limited as long as it is capable of rotating the center ring 80 of the rolling bearing 36. For example, as shown in FIG. 5, it can be a motor 82 for driving the center ring which supplies drive power to the center ring 80 via "gearing mechanism" mainly comprising a first gear 84 (pinion gear) and a second gear 86 (internal gear).

Herein, the first gear 84 is fixed to a drive shaft of the motor 82 for driving the center ring (not shown) while the second gear 86 is provided on the inner circumference of the center ring 80.

The second gear 86 (internal gear) is formed on the inner circumference of a projection 88 of the center ring 80 which projects in an axial direction (projection that projects relative to the inner ring and the outer ring). FIG. 5 illustrates such an example that the second gear 86 is the internal gear being formed on the inner circumference of the projection 88 of the center ring 80 but the second gear 86 may be an external gear formed on the outer circumference of the projection 88. By providing the second gear 86 on the projection 88, the gearing mechanism can be arranged efficiently without hindering the rotation of other bearing rings, e.g. the inner ring 70 and the outer ring 72.

The motor 82 for driving the center ring 80 may always stay on but from a view point of saving the energy, it is preferable to turn on and off the motor 82. For instance, it is preferable to activate the motor 82 regularly by a calendar timer such as a timer switch, or to activate the motor 82 by the controller (control unit) 60 only when the lubrication state of the rolling bearing 36 is predicted to worsen.

Especially, it is preferable to use the controller 60 so as to control the motor 82 to rotate the center ring 80 when the pitch of the blade 8 is not changed for a predetermined period of time. By this, the motor 82 for driving the center ring 80 is not activated except for the time when the pitch of the blade 8 has not been changed for a long period of time and the lubrication state is predicted to worsen, resulting in not wasting the energy.

Moreover, the second gear 86 may be arranged on the entire circumference of the center ring 80 or partially on an outer circumference or on an inner circumference. In such case, by reciprocating the first gear 84 by the motor 82 for the center ring 80, the center ring 80 rotates clockwise and counter-clockwise.

As an example structure of the gearing mechanism for rotating the center ring 80, in the present embodiment, the case in which the first gear 84 formed of a pinion gear and the second gear 86 formed of an internal gear has been described but not limited thereto. A variety of gears may be used such as a worm gear.

In the preferred embodiment, the inner ring 70 is fixed to the blade 8 by the bolt 77 and the outer ring 72 is fixed to the rotor hub 6A by the bolt 78 and it is obvious to a skilled person to reverse this structure by fixing the outer ring 72 to the blade 8 by a bolt and fixing the inner ring 70 to the rotor hub 6A by a bolt.

In this manner, in the wind turbine generator 1 in relation to the present embodiment, even in a state that the inner ring 70 and the outer ring 72 are still relative to each other and subjected to high load, the rolling bearing 36 can keep in the lubrication state by rotating only the center ring 80.

While the present invention has been described with reference to exemplary embodiments, it is to be understood that the invention is not limited to the disclosed exemplary embodiments and that modifications and variations are possible within the scope of the appended claims.

The preferred embodiments are explained herein for applying the rolling bearings (29 and 36) having the center ring (50 and 80) and the center ring drive unit for driving the center ring (50 and 80) to the nacelle turning mechanism 20 and the pitch control mechanism 30 respectively. However, it is possible, for example, to use one of the rolling bearings 29 and 36, or to provide a bearing having the structure similar to the rolling bearings 29 and 36 between other two members (the first member and the second member) which rotate relatively.

The invention claimed is:

1. A rolling bearing for a wind turbine generator for supporting a first member and a second member which rotates relative to the first member, the rolling bearing comprising:
   an inner ring to which the first member is fixed;
   an outer ring to which the second member is fixed;
   a center ring held between the inner ring and the outer ring without being fixed to the first member and the second member and, wherein said center ring is rotatable independently of the inner ring and the outer ring;
   rolling elements which are provided between the inner ring and the center ring and between the center ring and the outer ring in such a manner that the rolling elements are allowed to freely roll;
   a center ring drive unit for rotating the center ring; and,
   a control unit for controlling the center ring drive unit to intermittently rotate the center ring.

2. The rolling bearing for the wind turbine generator according to claim 1, further comprising:
   a control unit for controlling the center ring drive unit to rotate the center ring when the first member is kept still relative to the second member for a predetermined period of time.

3. The rolling bearing for the wind turbine generator according to claim 1, wherein the center drive unit includes a power source which supplies power to a drive shaft and a gearing mechanism which transmits the power having been outputted from the drive shaft to the center ring.

4. The rolling bearing for the wind turbine generator according to claim 3, wherein the center ring has a projecting portion which projects in an axial direction relative to the inner ring and the outer ring, and wherein the gearing mechanism includes a first gear which is fixed to the drive shaft of the center ring drive unit and a second gear which is formed on an inner or outer circumference of the projecting portion of the center ring and meshes with the first gear.

5. The rolling bearing for the wind turbine generator according to claim 3, wherein the gearing mechanism includes a worm gear which is fixed to the drive shaft and another gear which is formed on an end surface of the center gear in an axial direction thereof and meshes with the worm gear.

6. The rolling bearing for the wind turbine generator according to claim 1, wherein one of the first member and the second member is a blade and the other is a rotor hub.

7. The rolling bearing for the wind turbine generator according to claim 1, wherein one of the first member and the second member is a tower installed upright on a base and the other is a nacelle.

8. A wind turbine generator comprising:
   the rolling bearing of claim 1;
   a first member which is fixed to the inner ring of the rolling bearing; and
   a second member which is fixed to the outer ring of the rolling bearing and rotates relative to the first member.

* * * * *